United States Patent [19]

Doucet

[11] 4,352,734
[45] Oct. 5, 1982

[54] METHOD OF FILTERING A FLUID AND FILTER

[76] Inventor: Charles Doucet, 20 Avenue Tronchet, 1226 Thônex, Genèva, Switzerland

[21] Appl. No.: 228,694

[22] Filed: Jan. 27, 1981

Related U.S. Application Data

[63] Continuation of Ser. No. 62,882, Aug. 1, 1979, abandoned, which is a continuation of Ser. No. 917,397, Jun. 20, 1978, abandoned, which is a continuation of Ser. No. 742,523, Nov. 16, 1976, abandoned.

[30] Foreign Application Priority Data

Nov. 24, 1975 [CH] Switzerland ................. 15215/75

[51] Int. Cl.³ ............................................. B01D 29/22
[52] U.S. Cl. ............................... 210/741; 210/108; 210/798; 210/409
[58] Field of Search ............... 210/479, 409, 433.1, 210/460, 498, 106, 108, 798, 767, 741, 791

[56] References Cited

U.S. PATENT DOCUMENTS

| | | | |
|---|---|---|---|
| 671,003 | 4/1901 | Ruthenburg | 210/498 |
| 1,371,143 | 3/1921 | Bledburn | 210/460 |
| 1,477,986 | 12/1923 | Thiens | 210/409 |
| 2,998,064 | 2/1957 | Lang | 210/409 |
| 3,278,031 | 10/1966 | Resaen | 210/106 |
| 3,623,607 | 11/1971 | Loos | 210/106 |
| 3,724,669 | 4/1973 | Thal | 210/409 |
| 3,794,179 | 2/1974 | Doucet | 210/409 |

*Primary Examiner*—Benoît Castel
*Attorney, Agent, or Firm*—Martin Smolowitz

[57] ABSTRACT

A stream of water is filtered in a self-flushing type filter having filtering surfaces of different filtering fineness which provide a progressive filtering, firstly by fine filtering surfaces then by coarser filtering surfaces as the finer filtering surfaces become clogged.

9 Claims, 4 Drawing Figures

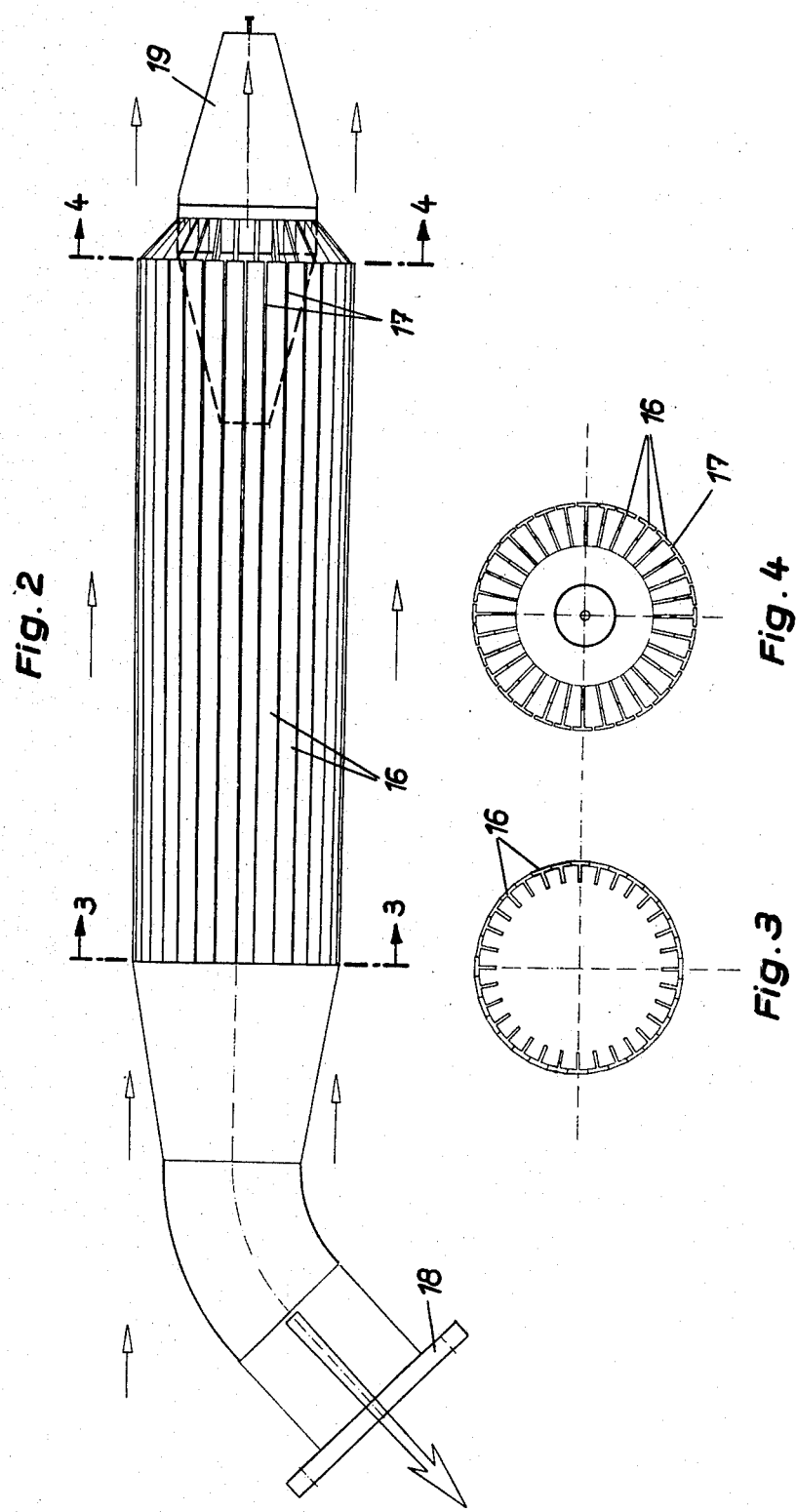

METHOD OF FILTERING A FLUID AND FILTER

This is a continuation of application Ser. No. 62,882 filed Aug. 1, 1979; which is continuation of Ser. No. 917,397 filed June 20, 1978, which is a continuation of Ser. No. 742,523 filed Nov. 16, 1976, all now abandoned.

The fineness of a filter is usually provided when the filter is manufactured; to change the fineness it is necessary to replace the filtering elements.

There are also filters with which the fineness can be increased or reduced without changing filter elements, simply by loosening or tightening a continuous filter element formed of a pile of discs or the turns of a helicoidal spring.

In each case, however, an intervention is necessary to change the fineness of the filter. However difficult or simple it may be, from complete dismantling to simple adjustment, such an intervention is always necessary. No known filtering systems enable the fluid to be filtered to "select" a passage with a greater or lesser fineness as a function of the difficulty of the filtration, without any kind of intervention.

The invention concerns a method of filtering a fluid using a filter involving automatic cleaning of the filtering surface by flushing with a current of the fluid.

The method according to the invention is characterized in that the fluid to be filtered is passed through filtering surfaces of different fineness in a manner to obtain a graduated filtering.

The invention also concerns a filter for carrying out the above method, this filter being characterized in that it includes filtering surfaces of different fineness.

One preferably uses a filter having filtering elements of different finenesses or progressive fineness or of such a shape that the fluid to be filtered passes, as indicated above, naturally through the fineness best adapted to the impurity charge of the fluid and its rate of flow at the moment of filtration.

The accompanying drawings show, by way of example, two embodiments of filter according to the invention. In the drawings:

FIG. 2 is a side elevational view of a second embodiment of filter;

FIG. 3 is a cross-section along line 3—3 of FIG. 2; and

FIG. 4 is a cross-section along line 4—4 of FIG. 2.

Figure 1:
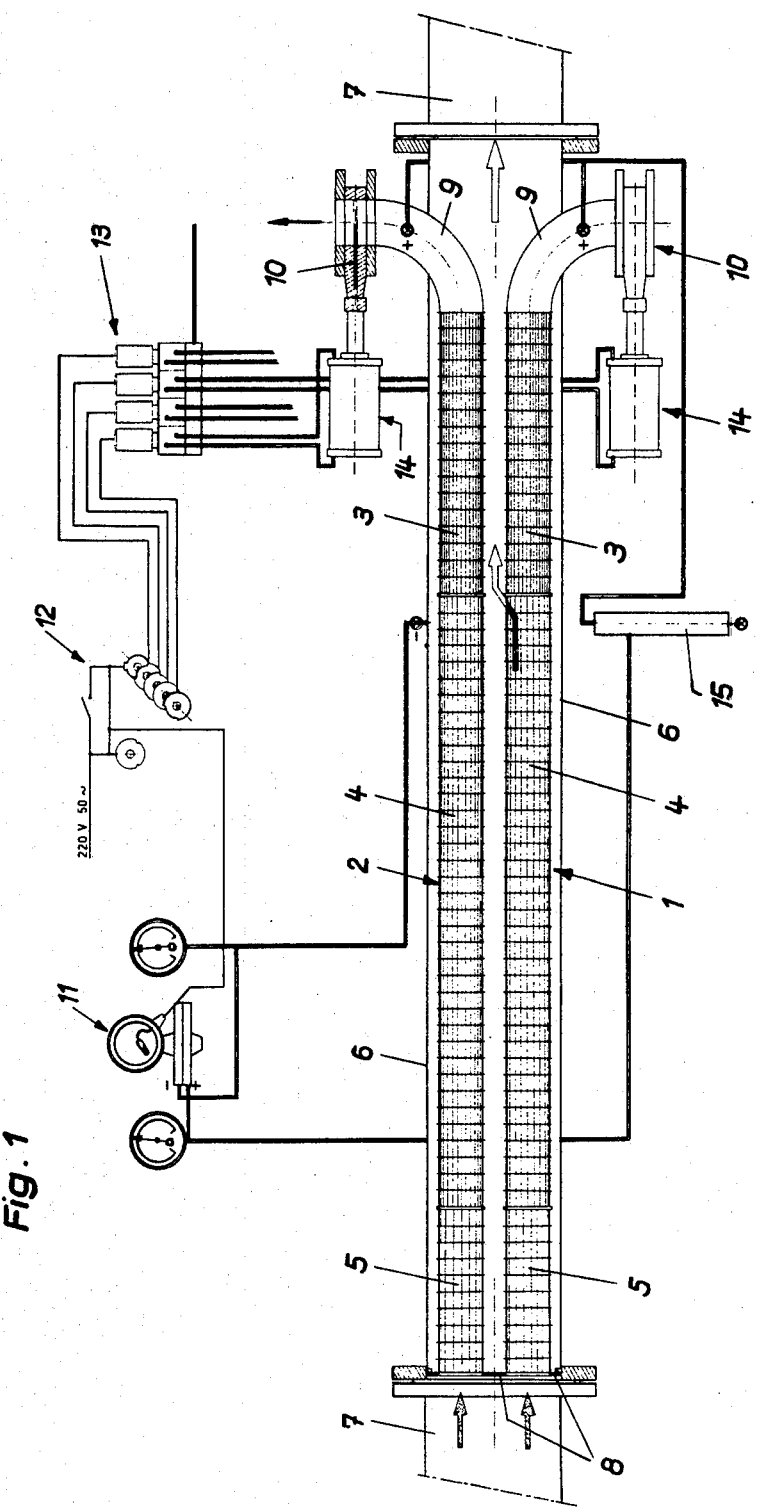
FIG. 1 is a schematic view of a filtering installation including a first embodiment of filter, shown in longitudinal cross-section.

The filter for water under pressure shown in FIG. 1 is formed of four tubular elements, two of which are shown at 1 and 2, each formed of three filtering tubes 3, 4 and 5 welded end-to-end. The downstream filtering tube 3 has fine sized filter passages, the intermediate tube 4 medium sized filter passages and the upstream filtering tube 5 course filter passages.

The filtering elements 1, 2 are mounted in a fluid-tight casing 6 forming a filter body and which is connected between two sections of a pipe 7 along which water to be filtered and filtered water flows. A diaphragm 8 at the inlet end directs the dirty water to be filtered into the elements 1, 2. As the water flows along casing 6 it passes through the filter elements and the filtered water flows out of the downstream end of casing 6.

At the downstream end of each filtering element 1, 2 is welded an elbow 9 passing fluid-tightly through the envelope 6. An automatic flushing valve 10 is mounted in the open end of each elbow 9. These valves 10 are normally closed.

In operation, water arrives from the first section of pipe 7 at a relatively great speed (of the order of 2 to 4 m/sec), penetrates in the filtering elements 1 and 2 and, by virtue of the speed and momentum of the water, passes through a filtering zone in the finest size filtering tubes 3. There is thus formed a virtual ring which represents the filtering zone of each element of the filter. As impurities become deposited along the filtering surface and clog it, this ring moves towards the inlet of the filter, i.e. towards the coarsest filtering tube 5. When the filtering surfaces have become clogged to a certain degree, a differential pressure manostat 11 detecting the head loss on either side of the filtering elements (+ and −) actuates opening of the flushing valves 10 by the intermediate of a programmer 12, electro-valves 13 and pneumatic control pistons 14. A decanting device 15 protects the control apparatus. When the flushing valves 10 are opened, a current of flushing water sweeps the inside of each filtering element 1, 2 and hence cleans all of its filtering surface. Then the valves 10 are closed and the filtering cycle recommences, the virtual ring reforming at the downstream end of the filtering elements.

An advantage of the described filter is that in the case of easy filtering of relatively clean water, the operative tubes are the fine ones 3. In the case of filtering normally charged water, the intermediate tubes 4 with a medium filtering fineness operate and in the case of exceptional hardness (roughness) the coarse filtering tubes 5 may, for a certain time, supply filtered water. It is in effect preferable, in the latter instance, to have an adequate supply of not-so-well filtered water rather than a shortage of filtered water or no filtered water at all, as may happen with fine filters which during periods of rough water necessitate continual cleaning.

The embodiment shown in FIGS. 2 and 4 is a strainer which is placed in a current of water and is formed, say, of one filtering element immersed in a river, for example, and comprising a series of longitudinal T-section profiles 16 disposed in a cylindrical configuration and defining slots 17 along generatrices of the cylinder, these slots 17 being progressively wider from upstream to downstream, in relation to the principal current of water to be filtered, represented by the arrows. At its upstream end, the cylindrical part of the strainer is extended by a tapered section leading to an elbow pipe and terminates with a flange 18 which is connected to an evacuation pipe for filtered water, not shown. At the downstream end, the filter comprises a hydrodynamic device assisting the free evacuation of all impurities carried by the current, as will be described below.

The water to be filtered penetrates from the exterior of the strainer through the longitudinal slots 17, and the filtered water is evacuated via the elbow pipe and flange 18 thereby providing a reversal of the flow direction for water passing through the filter. According to hydraulic laws confirmed in practice, the water penetrates into the filter from the beginning (i.e. upstream end) of the slots 17, hence by the finest part of the filter.

When, following a period of rough water for example, the initial filtering zone becomes clogged, the filtering zone moves slightly downstream and consequently the water being filtered penetrates the filter by wider parts of the slots 17 and re-establishes a filtering equilibrium.

After the period of rough water having caused displacement of the filtering zone by clogging of the slots 17, the difficulty of filtering disappears and, when the impurities having clogged the narrowest part of the slots 17 have been swept away by the current, the filtering zone reassumes its initial place towards the narrow end of the slots 17.

The enlarging of the slots 17 from upstream to downstream facilitates cleaning of the strainer by the current.

At the downstream end of the strainer where the non-filtered water carrying the impurities flows, a hydrodynamic device 19 with two conical deflectors enables the impurities to be evacuated without them being able to cling to the end of the strainer. One of the cones, shown in broken lines, is disposed inside the strainer with its narrower end upstream, so as to form a deflector which assists the removal of the impurities. The other, external cone tapers in the downstream direction and prevents eddys.

In the two described examples, the progression from a fine filtering to a coarser filtering—and vice versa—takes place automatically without any intervention: there is a natural filtering equilibrium between the charge of impurities and the filtering threshold (fineness), the filtering zone moving to-and-fro along the filtering element(s) as a function of these two parameters.

What is claimed is:

1. A method for filtering a liquid containing solid particles by using a filter element provided with filter openings in a lateral wall, the size of said openings varying from fine openings at one end of the filter to coarser openings toward the opposite end, said method including the steps of: flowing the liquid at a speed sufficient to produce a difference of pressure between the sides of the filter element at the end of the filter where the openings have finer size and compelling the liquid to pass selectively through the finer openings where greater difference of pressure exists, introducing the liquid to be filtered at high speed into the filter element at the end having the coarser filtering openings and closing the opposite end of the filter element during the filtering operation, thereby producing an increase in differential pressure across the filtering element at said opposite end, causing the liquid to pass selectively through the finer filtering openings at said opposite end, and causing filtration action to automatically move away from said end of said filter having the finer openings in dependence of the axial speed of the liquid and in proportion to the solid impurities in the liquid.

2. A method for filtering a liquid containing solid particles by using a filter element provided with filter openings in a lateral wall, the size of said openings varying from fine openings at one end of the filter to coarser openings toward the opposite end, said method including the steps of: flowing the liquid at a speed sufficient to produce a difference of pressure between the sides of the filter element at the end of the filter where the openings have finer size and compelling the liquid to pass selectively through the finer openings where greater difference of pressure exits, immersing the filter in a flowing liquid so that its axis is substantially parallel to the flow direction of the liquid and the finer filtration openings being located at the upstream end of the filter, evacuating the filter through an aspiration pipe connected to said filter upstream end, for producing thereat a lower pressure inside the filter than outside, compelling the liquid to pass selectively inwardly through the finer filtration openings in the filter, and causing filtration action to automatically move away from said end of said filter having the finer openings in dependence of the axial speed of the liquid and in proportion to the solid impurities in the liquid.

3. A method for filtering a flowing liquid utilizing a self-flushing type filter, comprising:
    (a) passing the liquid rapidly along a filtering element having openings in a lateral wall, wherein the size of said openings varies progressively from coarser openings at one end of the filter element to finer openings at the opposite end;
    (b) directing the liquid flow first into the inside of the filter element having the coarser openings and causing it to pass to the opposite end of the filter element due to the momentum of the flowing liquid, and selectively passing the liquid radially outwardly through the filter element finer openings;
    (c) producing a pressure difference adjacent the filter end having said finer size openings to cause liquid to flow selectively initially through the finer openings due to a greater pressure difference produced by the flowing liquid at that end, so as to remove solids from the liquid and whereby filtration action automatically moves progressively from the finer openings towards the coarser openings as the finer openings become clogged; and
    (d) periodically removing the solids material accumulation from the filtering element surface by a flushing action using the flowing liquid.

4. A method for filtering a flowing liquid utilizing a self-flushing type filter immersed within said liquid, comprising:
    (a) passing the liquid rapidly along a filtering element having openings in a lateral wall, wherein the size of said openings varies progressively from coarser openings at one end of the filter element to finer openings at the opposite end;
    (b) producing a pressure difference by evacuating the filter upstream inlet end adjacent the finer openings, and flowing the liquid selectively first radially inwardly through the finer size openings in the filtering element to cause liquid to flow selectively initially through the finer openings due to a greater pressure difference produced by the flowing liquid at that end, so as to remove solids from the liquid and whereby filtration action automatically moves progressively from the finer openings towards the coarser openings as the finer openings become clogged; and
    (c) periodically removing the solids material accumulation from the filtering element surface by a flushing action using the flowing liquid.

5. The filtering method of claim 4, wherein the liquid flow is directed first through a filter element longitudinally and radially outward through the finer openings at the opposite end of the filter element, monitoring the pressure difference across the filtering element, and periodically flushing the filter element inner surfaces clean of impurities using the flowing liquid by opening flushing valve means when said pressure differential across the filtering element reaches a predetermined amount, then closing the flushing valve means to resume filtering of the flowing fluid.

6. The method of claim 4, wherein the direction of liquid flow is reversed in passing through the filter.

7. The method of claim 4, wherein the flowing liquid is water.

8. A method for filtering a flowing liquid utilizing a self-flushing type filter, comprising:
  (a) passing the liquid within said filter rapidly along a surface of a filtering element having openings therein, wherein the size of said openings varies progressively from coarser openings at one end of the filtering element to finer openings at the opposite end, and the liquid flows first into the inside of the filtering element at the end having the coarser openings and passes to the opposite end of the element;
  (b) producing a pressure difference across the filtering element adjacent the finer size openings and thereby causing the liquid to flow selectively initially through the finer openings due to a greater pressure difference produced at that end by the rapidly flowing liquid, so as to remove solids material from the liquid and whereby filtration action automatically moves progressively from the finer openings towards the coarser openings as the finer openings become clogged; and
  (c) periodically removing the solids material accumulation from the filtering element surface by a flushing action using the flowing fluid.

9. A method for filtering a flowing liquid using a self-flushing type filter immersed within said liquid, comprising:
  (a) passing the liquid longitudinally along a filtering surface having longitudinal openings in a lateral wall, wherein the width of said openings varies progressively from narrow openings at the filter inlet end to wider openings at the opposite end;
  (b) producing a pressure difference across the filtering surface adjacent the element narrow openings by evacuating the filter upstream inlet end and thereby causing the liquid to flow selectively initially through the narrow openings due to the greater pressure difference at that end produced by the flowing liquid, so as to remove solids from the liquid and so that filtration action moves automatically from the narrow openings towards the wider openings; and
  (c) continuously removing the solids material accumulation from the filtering outer surface by a flushing action of the flowing liquid.

* * * * *